United States Patent Office 3,251,815
Patented May 17, 1966

3,251,815
POLYMERIZATION OF ONE OR MORE CONJUGATED DIOLEFINS WITH A CATALYST CONSISTING OF VOCl$_3$
Noboru Yamada and Keizo Shimada, Iwakuni-shi, Yamaguchi-ken, Japan, assignors to Teijin Limited, Osaka, Japan, a corporation of Japan
No Drawing. Filed Feb. 27, 1963, Ser. No. 261,493
Claims priority, application Japan, Mar. 9, 1962, 37/8,567
4 Claims. (Cl. 260—82.1)

This invention relates to a method of polymerizing one or more conjugated diolefins.

As method of preparing solid polymers by polymerizing conjugated diolefins such as isoprene, butadiene, etc., methods of employing various catalysts have been known in the past. These methods include a radical polymerization using a peroxide catalyst and an ion polymerization using a Friedel-Crafts catalyst, such as anhydrous aluminum chloride, or a Ziegler catalyst consisting of an organic aluminum compound and a compound of a transition metal.

The method of this invention relates to a method of polymerizing one or more conjugated diolefins using a vanadyl chloride (VOCl$_3$) as the catalyst.

Vanadyl chlorides exhibit catalytic activity markedly different from that of the so-called Friedel-Crafts type catalyst such as anhydrous aluminum chloride. Namely, while anhydrous aluminum chloride, as is known, is used as a catalyst in the polymerization of isobutylene, vanadyl chloride shows practically no catalytic activity in the polymerization of isobutylene. Also, whereas the Friedel-Crafts type catalysts such as anhydrous aluminum chloride and the like can exhibit practically no catalytic activity in the polymerization of conjugated diolefins such as isoprene and butadiene which are used in this invention as the starting material, by using as the catalyst a vanadyl chloride (VOCl$_3$) according to the present invention the conjugated diolefins such as isoprene and butadiene or a mixture of two or more thereof are very promptly polymerized to yield a solid polymerized material. The conjugated olefinic polymers so obtained have valuable utility as an elastomer or plastic.

While vanadyl chlorides include a number of compounds such as those represented generally by the formulae VOCl$_3$, VOCl$_2$, VOCl and V$_2$O$_2$Cl, among these, the vanadyl chloride having the formula VOCl$_3$ is used particularly as the catalyst in this invention. Hence, vanadyl chloride, as used herein, refers to the vanadyl chloride having the formula VOCl$_3$ unless indicated otherwise.

While all the compounds represented by the formulae VOCl$_2$, VOCl and V$_2$O$_2$Cl are solid at room temperature, the vanadyl chloride (VOCl$_3$) used as the catalyst in this invention is liquid (boiling point 126–127° C.) at room temperature. This vanadyl chloride may be obtained, for example, by mixing vanadium trioxide (V$_2$O$_3$) and carbon, heating the mixture to about 400° C. while passing through dry chlorine gas, and thereafter distilling and purifying the resulting reaction product. It may also be possible to prepare said vanadyl chloride from phosphorus pentoxide and vanadium pentoxide. However, the process by which vanadyl chloride is prepared is of course not critical, it being possible to use according to this invention, as the catalyst therefor, vanadyl chloride produced by any process.

The vanadyl chloride used in the method of this invention which is a yellow liquid having a boiling point of 126–127° C., as described above, is characterized in that it reacts with water or alcohol and decomposes.

The conjugated diolefins capable of polymerization according to the present invention include, for example, isoprene, butadiene, 2,3-dimethylbutadiene, 2-ethyl-1,3-butadiene, 2-propyl-1,3-butadiene, 2-methyl-1,3-pentadiene, 2-methyl-1,3-hexadiene, or a mixture of two or more of such compounds.

The polymerization of the conjugated diolefins according to the invention is carried out in an inert organic solvent. Suitable as this inert organic solvent are the saturated hydrocarbons such as hexane, heptane, octane, benzene, etc. or the halogenated hydrocarbons such as methylene chloride, ethylene chloride, chloroform, carbon tetrachloride, etc. Hence, the compounds used are those which do not contain active hydrogen such as, for example, water and alcohol. The polymerization is carried out by adding to an organic solvent solution of vanadyl chloride in the absence of oxygen and water a conjugated diolefin (e.g. isoprene or butadiene) or a mixture thereof and mixing with stirring at a temperature of −80° C. to 100° C., preferably 0° C. to 70° C. When the conjugated diolefin is added to the reaction system, the solution turns red. Alternatively, the reaction may be effected by adding the catalyst to a solution of the conjugated diolefin. The reaction may be carried out at either normal or lower atmospheric pressure. After completion of the reaction, the catalyst may be inactivated by the addition of alcohol to the reaction mixture, whereby the reaction mixture changes from green to yellow, and a white solid polymer is separated. The polymer can then be washed and the catalyst residue be removed.

Alcohols suitably used in this instance are, for example, methyl alcohol, ethyl alcohol, isopropyl alcohol. The solid polymer so obtained is amorphous, and it consists of a rubbery portion which is soluble in heptane or benzene, and an insoluble white powdery portion.

The amount of vanadyl chloride used is 0.1–10% by weight, preferably 0.5–5% by weight, based on the total of the weight of the conjugated diolefin and the inert organic solvent. The inert organic solvent, on the other hand, is generally used in an amount preferably from 0.5 to 10 times by weight of the conjugated diolefin.

For a still clearer understanding of the invention, the following examples are given.

Example 1

An ampoule filled with 5 cc. of vanadyl chloride was placed in a 500 cc. autoclave with electromagnetic agitation. After removing the air therefrom by reducing the pressure, 150 cc. of heptane and 35 grams of isoprene were introduced. Thereafter, the pressure was returned to normal atmospheric pressure with dehydrated and purified nitrogen gas and then while maintaining a temperature of 50° C. using a constant temperature bath, agitation was carried out for 6 hours. The reaction mixture was then taken out, the catalyst was decomposed by adding methanol, and after filtering, purification was effected by further addition of methanol. By doing thus, 27 grams of a white and solid polymer was obtained. This polymer consisted of 7 grams of a rubbery polymer soluble in heptane and 20 grams of a white and powdery polymer insoluble in heptane.

Example 2

Into a 100-cc. pressure-resistant glass vessel were introduced under a stream of nitrogen 3 cc. of vanadyl chloride, 50 cc. of benzene and 20 grams of isoprene, and while maintaining a temperature of 50° C., agitation was carried out for 10 hours. The reaction mixture was then taken out and treated with methanol. In this manner were obtained 3 grams of a heptane-soluble polymer and 10 grams of a heptane-insoluble polymer.

Example 3

An ampoule filled with 1 cc. of vanadyl chloride was placed in a 100-cc. pressure-resistant glass vessel, and after reduction of pressure were added 50 cc. of carbon tetrachloride and 20 grams of isoprene, following which the vessel was returned to normal atmospheric pressure with dehydrated and purified nitrogen gas. Then, the vessel was cooled to 0° C. and the ampoule crushed, after which the reaction mixture was allowed to stand for 7 hours with occasional shaking. The reaction mixture was then taken out and purified with methanol. Thus was obtained 10 grams of a solid polymer.

Example 4

A 100-cc. pressure-resistant glass vessel was filled with 1 cc. of vanadyl chloride, 50 cc. of n-heptane and 20 grams of isoprene. After agitating for 20 hours at 10° C., methanol was added to the reaction mixture thereby decomposing the catalyst. After filtration, further purification was effected with methanol. Thus were obtained 2 grams of a rubbery substance and 6 grams of a powdery solid.

Example 5

A 100-cc. pressure-resistant glass vessel was filled under a stream of nitrogen with 1 cc. of vanadyl chloride, 50 cc. of n-heptane and 20 grams of butadiene, following which it was allowed to stand for 20 hours at 10° C. with occasional shaking. Subsequently, methanol was added to the reaction mixture to decompose the catalyst and effect purification.

One gram of a rubbery substance soluble in heptane and 3 grams of a powdery polymer insoluble therein were obtained.

Example 6

A 100-cc. pressure-resistant glass vessel was filled with 1 cc. of vanadyl chloride, 50 cc. of n-heptane, 4 grams of isoprene and 20 grams of butadiene, after which it was allowed to stand for 20 hours at 10° C. with occasional shaking.

After adding methanol to the reaction mixture to decompose the catalyst and then filtering, a further addition of methanol was made whereby purification was effected.

6.7 grams of a solid polymer was obtained in this manner.

Example 7

A 100-cc. pressure-resistant bottle was filled under a stream of purified nitrogen with an ampoule containing 10 millimoles of vanadyl chloride, 30 cc. of n-heptane and 20 grams of 2,3-dimethylbutadiene. After cooling to 0° C., the catalyst ampoule was crushed and the polymerization reaction was started, which was carried out for 20 hours with shaking and agitation while maintaining the polymerization temperature at 0° C. After completion of the polymerization, methanol was added to the reaction mixture to decompose the catalyst, following which the polymer was filtered off and then purified several times with methanol. 8.5 grams of a white polymer was obtained.

Example 8

An ampoule containing 10 millimoles of vanadyl chloride was charged to a 200-cc. autoclave with electromagnetic agitation, followed by introducing 50 cc. of n-heptane and 0.58 gram of isoprene therein. Then, after heating the autoclave to 80° C., the ampoule was crushed and the polymerization reaction was carried out with stirring for 10 hours. Upon completion of the polymerization, the reaction product was taken out and the catalyst was decomposed and removed using 500 cc. of methanol. After filtering off the polymer, it was washed several times with methanol to yield 18.3 grams of a solid polymer. This polymer consisted of 4.5 grams of a rubbery polymer soluble in n-heptane and a polymer insoluble therein, both of which, according to infrared absorption spectrum, were 3,4- and 1,2-addition polymers.

Example 9

A 100-cc. pressure-resistant bottle was filled under a stream of dry nitrogen with an ampoule containing 10 millimoles of vanadyl chloride, 40 cc. of ethyl chloride and 0.5 mole of isoprene, and the polymerization reaction was carried out at −70° C. for 5 hours. After completion of the polymerization, methanol was poured into the reaction mixture and the catalyst was decomposed whereby was separated out 1 gram of a rubbery polymer.

Since it is apparent that many changes and modifications can be made in the above-described details without departing from the nature and spirit of the invention, it is to be understood that the invention is not to be limited thereto except as set forth in the appended claims.

What we claim is:

1. A method of preparing a solid or rubbery polymer from at least an aliphatic conjugated diolefin, or mixtures thereof, which comprises polymerizing said aliphatic conjugated diolefin, or mixtures thereof, in the presence of an inert organic solvent and a catalyst consisting of $VOCl_3$, said $VOCl_3$ being in an amount of 0.1 to 10% based on the total weight of said aliphatic conjugated diolefins to be polymerized and the said inert organic solvent.

2. The method of claim 1 in which isoprene is used as said conjugated diolefin.

3. The method of claim 1 in which butadiene is used as said conjugated diolefin.

4. The method of claim 1 in which a mixture of isoprene and butadiene is used as the conjugated diolefins.

References Cited by the Examiner

UNITED STATES PATENTS 2,085,535   6/1937   Langedijk et al. ____ 260—94.8

FOREIGN PATENTS 219,708   1/1959   Australia.

JOSEPH L. SCHOFER, *Primary Examiner.*

E. J. SMITH, *Assistant Examiner.*